Patented Feb. 20, 1934

1,947,601

UNITED STATES PATENT OFFICE 1,947,601

PRODUCTION OF MIXED FERTILIZERS CONTAINING AMMONIUM NITRATE

Carl Krauch and Carl Eyer, Ludwigshafen-on-the-Rhine, and Gottwald Baetz, Oggersheim, and Friedrich Korn, Lugwigshafen-on-the-Rhine, Germany, assignors to I. G. Farbenindustrie Aktiengesellschaft, Frankfort-on-the-Main, Germany No Drawing. Application March 9, 1931, Serial No. 521,254, and in Germany June 5, 1928

13 Claims. (Cl. 71—9)

The present invention relates to improvements in the production of mixed fertilizers containing ammonium nitrate.

The production of mixed fertilizers containing ammonium nitrate is well known in the art. Most of the mixed fertilizers are prepared by mixing the components in the dry state. It has also been proposed to introduce the desired other components of the mixed fertilizers into melts or highly concentrated solutions of ammonium nitrate and then to solidify the mixtures for example by spraying. The products thus obtained have the drawback, however, that in addition to granular particles they contain substantial amounts of dust and that the said granular particles due to their rough and irregular surface tend to form further amounts of dust on mechanical attrition such as occurs during the shipping of the fertilizers.

We have now found that the aforesaid objections can be easily overcome by adding to the melts prior to spraying small quantities of calcium salts which are soluble therein and are not injurious to the plants, but preferably should have a fertilizing action themselves. Suitable calcium salts are for example calcium nitrate, calcium chloride and monocalcium phosphate. The said calcium salts are used in small quantities up to 10 per cent by weight of the melts. As a rule comparatively small amounts, for example about 6 per cent or even less, say from 3 to 6 per cent, are sufficient.

The melts prepared in accordance with the present invention have the advantage that they possess a comparatively low viscosity and therefore can easily be sprayed, whereby solid particles having about globular shape and a smooth surface and not being liable to form dust are obtained.

The following examples will further illustrate the nature of this invention which, however, is not limited to these examples.

Example 1

5 kilograms of calcium nitrate in the form of a highly concentrated solution are added to a melt consisting of 60.5 kilograms of ammonium nitrate to which 34.5 kilograms of powdered calcium carbonate have been added, and the mixture is then sprayed at about 110° C. by means of a centrifuge provided with perforated walls. The product obtained in this manner has a perfect, globular form with a smooth surface without any cracks or fissures.

Example 2

82.6 kilograms of a calcium nitrate solution of 87 per cent strength are added to 1000 kilograms of a 92 per cent ammonium nitrate melt. 567 kilograms of calcium carbonate powder are slowly introduced into this mixture at 103° C. and after stirring well the whole is sprayed by means of a centrifuge having perforated walls at 103° C. A solid product is obtained, the particles of which have globular shape and a smooth surface free from cracks, and which is free from dust and contains about 20.5 per cent of nitrogen.

Example 3

If 1000 kilograms of a 92 per cent ammonium nitrate melt, 182 kilograms of an aqueous calcium nitrate solution of 87 per cent strength and 1072 kilograms of powdered calcium carbonate are used in the manner described in the foregoing example and the resulting mixture is sprayed at 130° C., a globular product free from dust is obtained, the particles of which have a smooth surface free from cracks, and which contains about 16 per cent of nitrogen.

Example 4

80 kilograms of calcium chloride are dissolved in 1000 kilograms of a 92 per cent ammonium nitrate melt and 531 kilograms of calcium carbonate are then introduced while stirring. The melt is sprayed at 92° C. by means of a centrifuge having perforated walls. A globular product is obtained which after drying contains about 20.5 per cent of nitrogen.

Example 5

107 kilograms of calcium chloride are added to 1000 kilograms of an ammonium nitrate melt of 92 per cent strength; 978 kilograms of calcium carbonate in a state of fine subdivision are then added and the whole is sprayed at 98° C. A product containing about 16 per cent of nitrogen is obtained.

Example 6

50 kilograms of monocalcium phosphate are dissolved in 500 kilograms of an ammonium nitrate melt containing 8 per cent of water. 445 kilograms of potassium sulphate are then stirred into the melt at 130° C., and the melt is solidified by spraying, whereby uniform rounded granules are formed which contain the plant nutrients potassium and nitrogen in the proportion of $K_2O : N_2 = 1.5 : 1$.

Example 7

110 kilograms of monocalcium phosphate and 1500 kilograms of ammonium sulphate are introduced into 1250 kilograms of an ammonium nitrate melt of 96 per cent strength and stirred until a uniform product is obtained. The resulting melt containing 2 per cent of water is sprayed at about 148° C. whereby a product of globular shape and having a smooth surface is obtained.

This application is a continuation in part of our copending application Ser. No. 360,614, filed May 4th, 1929.

What we claim is:—

1. In the production of a solid mixed fertilizer containing ammonium nitrate by solidification of a melt of said mixed fertilizer, the step of adding to the melt up to 10 per cent by weight thereof of a salt selected from the group consisting of calcium nitrate, calcium chloride and monocalcium phosphate.

2. In the production of a solid mixed fertilizer containing ammonium nitrate by solidification of a melt of said mixed fertilizer, the step of adding to the melt up to 10 per cent by weight thereof of calcium nitrate.

3. In the production of a solid mixed fertilizer containing ammonium nitrate by solidification of a melt of said mixed fertilizer, the step of adding to the melt up to 10 per cent by weight thereof of calcium chloride.

4. In the production of a solid mixed fertilizer by solidification of a melt containing ammonium nitrate and calcium carbonate, the step of adding to the melt up to 10 per cent by weight thereof of a salt selected from the group consisting of calcium nitrate, calcium chloride and monocalcium phosphate.

5. In the production of a solid mixed fertilizer by solidification of a melt containing ammonium nitrate and calcium carbonate, the step of adding to the melt up to 10 per cent by weight thereof of calcium nitrate.

6. In the production of a solid mixed fertilizer by solidification of a melt containing ammonium nitrate and calcium carbonate, the step of adding to the melt up to 10 per cent by weight thereof of calcium chloride.

7. As a new article of manufacture, a mixed fertilizer comprising ammonium nitrate and at least one further fertilizing ingredient, and containing in addition thereto up to 10 per cent by weight of a salt selected from the group consisting of calcium nitrate, calcium chloride and monocalcium phosphate, said fertilizer being composed of granules having a smooth surface and not liable to dust formation.

8. As a new article of manufacture, a mixed fertilizer comprising ammonium nitrate and at least one further fertilizing ingredient, and containing in addition thereto up to 10 per cent by weight of calcium nitrate, said fertilizer being composed of globular granules having a smooth surface and not liable to dust formation.

9. As a new article of manufacture, a mixed fertilizer comprising ammonium nitrate and at least one further fertilizing ingredient, and containing in addition thereto up to 10 per cent by weight of calcium chloride, said fertilizer being composed of globular granules having a smooth surface and not liable to dust formation.

10. As a new article of manufacture, a mixed fertilizer comprising ammonium nitrate and calcium carbonate, and containing in addition thereto up to 10 per cent by weight of a salt selected from the group consisting of calcium nitrate, calcium chloride and monocalcium phosphate, said fertilizer being composed of globular granules having a smooth surface and not liable to dust formation.

11. As a new article of manufacture, a mixed fertilizer comprising ammonium nitrate and calcium carbonate, and containing in addition thereto up to 10 per cent by weight of calcium nitrate, said fertilizer being composed of globular granules having a smooth surface and not liable to dust formation.

12. As a new article of manufacture, a mixed fertilizer comprising ammonium nitrate and calcium carbonate, and containing in addition thereto up to 10 per cent by weight of calcium chloride, said fertilizer being composed of globular granules having a smooth surface and not liable to dust formation.

13. The product as defined in claim 7 wherein the granules of the fertilizer have a globular shape.

CARL KRAUCH.
CARL EYER.
GOTTWALD BAETZ.
FRIEDRICH KORN.